US006485790B2

(12) United States Patent
Walker et al.

(10) Patent No.: US 6,485,790 B2
(45) Date of Patent: Nov. 26, 2002

(54) METHODS FOR ENHANCING PENETRATION OF WOOD PRESERVATIVES

(75) Inventors: Leigh E. Walker, Macungie, PA (US); Shilan Shen, High Bridge, NJ (US)

(73) Assignee: Lonza Inc., Fair Lawn, NJ (US)

(*) Notice: Subject to any disclaimer, the term of this patent is extended or adjusted under 35 U.S.C. 154(b) by 0 days.

(21) Appl. No.: 09/972,839

(22) Filed: Oct. 5, 2001

(65) Prior Publication Data

US 2002/0061366 A1 May 23, 2002

Related U.S. Application Data

(63) Continuation of application No. PCT/US00/09649, filed on Apr. 7, 2000.

(60) Provisional application No. 60/128,376, filed on Apr. 8, 1999.

(51) Int. Cl.[7] .............................. B05D 7/06; C09D 5/14

(52) U.S. Cl. ...................... 427/397; 106/18.32; 252/380

(58) Field of Search .......................... 252/380; 427/397; 106/18.32

(56) References Cited

U.S. PATENT DOCUMENTS

| | | | | |
|---|---|---|---|---|
| 3,296,145 | A | 1/1967 | Findlan et al. | 252/106 |
| 3,484,523 | A | 12/1969 | Findlan et al. | 424/248 |
| 4,005,193 | A | 1/1977 | Green et al. | 424/168 |
| 4,336,151 | A | 6/1982 | Like et al. | 252/10 |
| 4,357,163 | A | 11/1982 | Amundsen et al. | 106/18.35 |
| 4,379,810 | A | 4/1983 | Amundsen et al. | 428/541 |
| 4,382,105 | A | 5/1983 | Amundsen et al. | 427/370 |
| 4,526,699 | A | 7/1985 | Jones et al. | 252/99 |
| 4,950,685 | A | 8/1990 | Ward | 514/479 |
| 5,304,237 | A | 4/1994 | Barth et al. | 106/18.3 |
| 5,468,284 | A | 11/1995 | Sturm | 106/2 |
| 5,500,153 | A | 3/1996 | Figueroa et al. | 252/548 |
| 5,536,305 | A | 7/1996 | Yu | 106/18.33 |
| H1635 | H | 3/1997 | Vander Meer | 510/220 |
| 5,641,726 | A | 6/1997 | Walker | 504/158 |
| 5,833,741 | A | 11/1998 | Walker | 106/2 |
| 5,855,817 | A | 1/1999 | Walker | 252/400.41 |
| 5,891,836 | A | 4/1999 | Kacher | 510/237 |
| 5,929,016 | A | 7/1999 | Harrison | 510/384 |
| 6,037,316 | A | 3/2000 | Garner et al. | 510/238 |
| 6,080,715 | A | 6/2000 | Bianchi et al. | 510/444 |
| 6,159,924 | A | 12/2000 | Weller et al. | 510/384 |
| 6,180,672 | B1 | 1/2001 | Lichtenberg et al. | 514/561 |

FOREIGN PATENT DOCUMENTS

| | | | |
|---|---|---|---|
| DE | 3839848 | * | 5/1990 |
| DE | 19640874 A1 | | 4/1998 |
| EP | 0161811 | | 11/1985 |
| EP | 0293556 | | 12/1988 |
| EP | 0 370 182 | | 8/1989 |
| EP | 0 381 482 | | 1/1990 |
| EP | 873687 | * | 10/1998 |
| JP | 57 22003 | | 2/1982 |
| JP | 1102002 | | 4/1989 |
| WO | 9701423 | | 1/1997 |
| WO | 98/31518 | | 7/1998 |
| WO | 9955453 | | 11/1999 |
| WO | 0059696 | | 10/2000 |
| WO | WO 00/71313 | * | 11/2000 |
| WO | WO 00/71314 | * | 11/2000 |

OTHER PUBLICATIONS

Tang et al, Material und Organismen, 33(4), pp 261–270, 2000.*

Archer, Kevin et al., Screening of Wood Preservatives: Comparison of the Soil–Block, Agar–Block, and Agar–Plate Tests, (1995) 86–89.

FTIR Studies on Weathering of Didecyldimethylammonium Chloride (DAC) Treated Wood; *Lui et al., Doc. No. IRG/WP/93–30013; The Int'l. Rsch. Grp. on Wood Preservatives, 1993.*

The Influence of Copper (II) Chemicals on the Weathering of Treated Wood, Part I. ACQ Treatment of Wood on Weathering; *Lui et al., Doc. No. IRG/WP/94–30040; The Int'l. Rsch. Grp. on Wood Preservatives, 1994.*

Encyclopedia of Chemical Technology; *1978 John Wiley & Sons, Inc., Amine Oxides, vol. 2, 259–271.*

(List continued on next page.)

*Primary Examiner*—Erma Cameron
(74) *Attorney, Agent, or Firm*—Darby & Darby

(57) ABSTRACT

Applicants have discovered that amine oxides enhance the uniform distribution and penetration of wood preservatives into wood substrates, minimize leaching of the wood preservatives, and improve the weatherability of the wood substrate. The present invention provides a method for enhancing the uniform distribution and penetration of at least one wood preservative into a wood substrate by applying a preservative composition to the wood substrate. The preservative composition comprises a wood distribution and penetration enhancing agent, which includes an amine oxide, and the wood preservatives. Another embodiment of the present invention is a method for enhancing the uniform distribution and penetration of one or more wood preservatives by applying the wood preservatives to the wood substrate and then applying the aforementioned wood distribution and penetration enhancing agent to the wood substrate. Alternatively, the wood distribution and penetration enhancing agent may be applied prior to application of the wood preservatives or both may be applied concurrently. Yet another embodiment is a preservative composition comprising a wood distribution and penetration enhancing agent and at least one wood preservative. Preferably, the composition comprises a uniform distribution and penetration enhancing effective amount of the wood distribution and penetration enhancing agent and a wood preserving effective amount of the wood preservative.

21 Claims, No Drawings

OTHER PUBLICATIONS

Alkylammonium Compounds as Wood Preservatives; L.E. Walker; 220–229; *Forest Products Society; Sep. 26–28, 1994, Savannah, GA*.

Recent Research on Alkylammonium Compounds in the U.S., *Preston et al., Proceedings of the 3rd American Wood–Preservers' Association; vol. 83. 331–348, 1987*.

Surface Characteristics of Wood Treatment with Various ACC, ACQ and CCA Formulations after Weathering; *Jin et al., 22nd Annual Meeting; Kyoto, JA May 20–24, 1991*.

Utility of Amine Oxides in Oil/Water Cosmetic Systems; *Like et al., J. Soc. Cosmet. Chem., 26, 155–168 Mar. 1975*.

Bacteriostatic, Fungistatic, and Algistatic Activity of Fatty Nitrogen Compounds; *Hueck et al., Applied Microbiology, vol. 14., May, 1966*.

* cited by examiner

METHODS FOR ENHANCING PENETRATION OF WOOD PRESERVATIVES

This is a continuation of International Application Serial No. PCT/US00/09649, filed Apr. 7, 2000 and claims the benefit of U.S. Provisional Application No. 60/128,376, filed Apr. 8, 1999, the disclosures of which are hereby incorporated by reference.

FIELD OF THE INVENTION

This invention relates to methods for enhancing the distribution and penetration of wood preservatives into a wood substrate with a wood penetration enhancing agent comprising an amine oxide. This invention also relates to preservative compositions comprising a wood preservative selected from quaternary ammonium compounds, amines. and salts thereof and an amine oxide.

BACKGROUND OF THE INVENTION

Current methods for treating wood with preservatives often do not provide uniform distribution and penetration of the preservatives into the wood. As a result, portions of the wood may decay while other portions remain well preserved.

Furthermore, wood preservatives frequently do not penetrate or poorly penetrate to the center of thick pieces of wood, such as posts, timbers, and boards. This often results in the wood rotting from the inside out. Wood preservatives typically preferentially absorb at certain locations or sites in the wood. Because of the lack of uniform distribution, certain locations of the wood do not receive the same wood preservative effect as other locations.

U.S. Pat. No. 5,833,741 discloses a waterproofing wood preservative system comprising a waterproofer and a biocide. The waterproofer is an alkyl amine oxide, an alkyl acetoacetate, or a waterproofing quaternary ammonium compound. The biocide comprises at least one specific biocidal quaternary ammonium compound.

U.S. Pat. No. 4,357,163 discloses a wood treating composition containing a chlorophenol, an aliphatic alcohol, a fatty acid amine oxide, and water.

There is a need for methods of enhancing the distribution and penetration of wood preservatives into wood in order to provide uniform distribution and penetration of the preservatives and to prevent decay in the inner and outer regions of the wood.

SUMMARY OF THE INVENTION

Applicants have discovered that amine oxides enhance the uniform distribution and penetration of wood preservatives into wood substrates, minimize leaching of the wood preservatives, and improve the weatherability of the wood substrate (i.e. improve the surface appearance of the wood, the wood's resistance to cracking, splitting, pitting, and changing color). The present invention provides a method for enhancing the uniform distribution and penetration of at least one wood preservative into a wood substrate by applying a preservative composition to the wood substrate. The preservative composition comprises a wood distribution and penetration enhancing agent, which includes an amine oxide, and the wood preservatives.

Another embodiment of the present invention is a method for enhancing the uniform distribution and penetration of one or more wood preservatives by applying the wood preservatives to the wood substrate and then applying the aforementioned wood distribution and penetration enhancing agent to the wood substrate. Alternatively, the wood distribution and penetration enhancing agent may be applied prior to application of the wood preservatives or both may be applied concurrently.

Yet another embodiment is a preservative composition comprising a wood distribution and penetration enhancing agent and at least one wood preservative. Preferably, the composition comprises a uniform distribution and penetration enhancing effective amount of the wood distribution and penetration enhancing agent and a wood preserving effective amount of the wood preservative.

DETAILED DESCRIPTION OF THE INVENTION

The present invention provides a method for enhancing the uniform distribution and penetration of at least one wood preservative into a wood substrate. The method comprises applying a preservative composition to the wood substrate. The preservative composition comprises a wood distribution and penetration enhancing agent and the wood preservative. The wood distribution and penetration agent includes one or more amine oxides.

The amine oxide may be a trialiphatic substituted amine oxide, an N-alkylated cyclicamine oxide, a dialkylpiperazine di-N-oxide, an alkyldi(hydroxylated oxyalkyl)amine oxide, a dialkylbenzylamine oxide, a fatty dimethylamido dimethylpropylamine oxide, a diamine oxide; a triamine oxide, or any combination of any of the foregoing. Examples of suitable amine oxides include, but are not limited to, alkyl, alkenyl or alkynyl amine oxides. Preferably, the amine oxide includes at least one $C_1$–$C_{18}$ alkyl moiety.

Preferred trialiphatic substituted amine oxides have the formula $R^1R^2R^3N\rightarrow O$, where $R^1$ is a linear, branched, cyclic or any combination thereof $C_6$ to $C_{40}$ saturated or unsaturated group; and $R^2$ and $R^3$ independently are linear, branched, or any combination thereof $C^1$ to $C_{40}$ saturated or unsaturated groups. $R^1$, $R^2$, and $R^3$ independently may be alkyl, alkenyl, alkynyl, cycloalkyl, aryl, or any combination of any of the foregoing. More preferably, $R^1$ is a linear, branched, cyclic or any combination thereof $C_6$ to $C_{22}$ saturated or unsaturated group, such as coco, hydrogenated tallow, soya, decyl, hexadecyl, and oleyl; and $R^2$ and $R^3$ independently are linear, branched, or any combination thereof $C_1$ to $C_{22}$ saturated or unsaturated groups, such as coco, hydrogenated tallowm, soya, decyl, and hexadecyl. According to a preferred embodiment, $R^1$ is a linear or branched $C_6$ to $C_{14}$ saturated or unsaturated group.

A preferred trialiphatic substituted amine oxide is a dialkylmethylamine oxide having the formula $R^1R^2CH_3N\rightarrow O$, where $R^1$ and $R^2$ are defined as above.

Another preferred trialkylamine oxide is an alkyldimethylamine oxide having the formula $R^1(CH_3)_2N\rightarrow O$, where $R^1$ is defined as above. Alkyldimethylamine oxides are non-toxic and non-mutagenic surfactants. More preferably, $R^1$ is a $C_6$–$C_{22}$ saturated or unsaturated group. Preferred alkyldimethylamine oxides include, but are not limited to, decyldimethylamine oxide, dodecyldimethylamine oxide, tetradecyldimethylamine oxide, hexadecyldimethylamine oxide, coco-dimethylamine oxide, octadecyldimethylamine oxide, hydrogenated tallow dimethylamine oxide, and any combination of any of the foregoing.

Preferred N-alkylated cyclicamine oxides have the formula $R^4R^5R^6N\rightarrow O$ where $R^4$ is defined as $R^1$ above and $R^5$ and $R^6$ are linked to form a cyclic group. The cyclic group typically contains from 4 to 10 carbon atoms and may optionally contain oxygen, sulfur, nitrogen, or any combination of any of the foregoing. More preferred N-alkylated cyclicamine oxides include, but are not limited to, an alkylmorpholine N-oxide, a dialkylpiperazine di-N-oxide, and any combination of any of the foregoing.

Preferred alkylmorpholine N-oxides have the formula

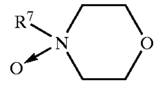

where $R^7$ is defined as $R^1$ above. According to a more preferred embodiment, $R^7$ is a linear or branched $C_{10}$ to $C_{16}$ alkyl. Examples of preferred alkylmorpholine N-oxides include, but are not limited to, cetyl morpholine N-oxide and lauryl morpholine N-oxide.

Preferred dialkylpiperazine di-N-oxides have the formula

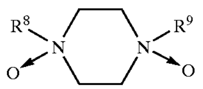

where $R^8$ is defined as $R^1$ above and $R^9$ is defined as $R^2$ above.

Preferred alkyldi(hydroxyalkyl)amine oxides have the formula

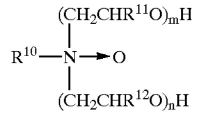

where $R^{10}$ is defined as $R^1$ above; $R^{11}$ and $R^{12}$ independently are H or $CH_3$; and m and n independently are integers from 1 to 10.

Preferred dialkylbenzylamine oxides have the formula $R^{13}R^{14}R^{15}N\rightarrow O$, where $R^{13}$ is defined as $R^1$ above; $R^{14}$ is defined as $R^2$ above; and $R^{15}$ is benzyl. More preferred dialkylbenzylamine oxides include, but are not limited to, alkylbenzylmethylamine oxides having the formula $R^{13}R^{15}CH_3N\rightarrow O$ where $R^{13}$ and $R^{15}$ are defined as above. According to a more preferred embodiment, $R^{13}$ is a linear or branched $C_8$–$C_{12}$ alkyl.

Preferred fatty dimethylamido dimethylpropylamine oxides have the formula

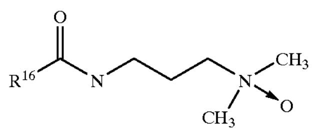

where $R^{16}$ is defined as $R^1$ above.

Preferred diamine oxides have the formula

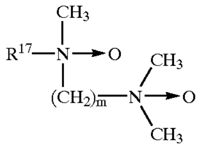

where $R^{17}$ is defined as $R^1$ above; and m is an integer from about 1 to about 10.

Preferred triamine oxides have the formula

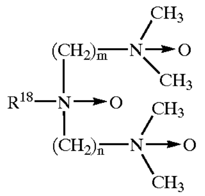

where $R^{18}$ is defined as $R^1$ above; and m and n independently are integers from about 1 to about 10.

Long chain ($C_{16}$ or greater) amine oxides, such as hexadecylamine oxides and hydrogenated tallow amine oxides, are particularly preferable for imparting waterproofing properties to the composition. Short chain ($C_{14}$ and shorter) amine oxides are particularly efficient wood distribution and penetration enhancing agents and aide in solubilizing long chain amine oxides.

The wood preservative may comprise a quaternary ammonium compound, amine, or salt thereof. Suitable quaternary ammonium compounds include, but are not limited to, those having the formula $R^{19}R^{20}R^{21}R^{22}N^+X^-$; where $R^{19}$, $R^{20}$, $R^{21}$, and $R^{22}$ independent are linear, branched, cyclic or any combination thereof saturated or unsaturated groups and X is an anion. The sum of the number of carbon atoms in $R^{19}$, $R^{20}$, $R^{21}$, and $R^{22}$ broadly ranges from about 10 to about 50. $R^{19}$, $R^{20}$, $R^{21}$, and $R^{22}$ may be alkyl, alkenyl, alkynyl, cycloalkyl, aryl, or any combination of any of the foregoing. X may be chloride, carbonate, bicarbonate, nitrile, bromide, iodide, acetate, dehydroacetate, laurate, stearate, carboxylate, or borate. Suitable carboxylate and borate anions include, but are not limited to, those disclosed in U.S. Pat. No. 5,641,726, which is hereby incorporated by reference.

A preferred quaternary ammonium compound has the formula $R^{19}(CH_3)_3N^+X^-$, where $R^{19}$ is a linear or branched $C_{10}$–$C_{20}$ saturated or unsaturated group, such as alkyl, alkenyl, or alkynyl group and X is defined as above. More preferably $R^{19}$ is a linear $C_{16}$–$C_{18}$ saturated or unsaturated group and X is chloride, carbonate, or acetate. An example of such a compound is N-octadecyl-N,N,N-trimethylammonium chloride.

Another preferred quaternary ammonium compound has the formula $R^{19}R^{20}(CH_3)_2N^+X^-$, where $R^{19}$ is a linear or branched $C_6$–$C_{20}$ saturated or unsaturated group or $C_6$–$C_{20}$ substituted or unsubstituted aryl group, $R^{20}$ is a linear or branched $C_1$–$C_{20}$ saturated or unsaturated group or $C_6$–$C_{20}$ substituted or unsubstituted aryl group, and X is defined as above. The term "substituted" as used herein includes, but is not limited to, substitution with any one or any combination of the following substituents: $C_1$–$C_4$ alkyl. Preferably, $R^{19}$ and $R^{20}$ independently are linear or branched $C_8$–$C_{15}$ saturated or unsaturated groups. In a more preferred embodiment, $R^{19}$ and $R^{20}$ independently are linear or branched $C_8$–$C_{12}$ saturated or unsaturated groups and X is chloride, carbonate, or acetate. Special mention is made of didecyldimethylammonium chloride, which is available as Bardac® 2280 available from Lonza Inc. of Fair Lawn, N.J.; didecyldimethylammonium bicarbonate; and didecyldimethylammonium carbonate; and N,N-di(tetradecyl/pentadecyl)-N,N-dimethylammonium chloride, which is available as Carsoquat® 457 from Lonza Inc. (Carsoquat® 457 is a mixture of N-tetradecyl-N-pentadecyl-N,N-dimethylammonium chloride, N,N-di(tetradecyl)-N,N-dimethylammonium chloride, and N,N-di(pentadecyl)-N,N-dimethylammonium chloride).

Another suitable quaternary ammonium compound has the formula $R^{19}R^{20}(CH_3)_2N^+X^-$), where $R^{19}$ is a substituted or unsubstituted benzyl group, $R^{20}$ is linear $C_{10}$ to $C_{20}$ saturated or unsaturated group, and X is defined as above. According to a preferred embodiment, $R^{19}$ is benzyl, $R^{20}$ is a linear $C_{12}$–$C_{18}$ saturated or unsaturated group, and X is chloride. Examples of such compounds include, but are not limited to, a mixture of N—($C_{12}$–$C_{16}$)alkyl-N-benzyl-N,N-dimethylammonium chloride, which is available as Barquat® MB from Lonza, Inc. of Fair Lawn, N.J.; and N-octadecyl-N-benzyl-N,N-dimethylammonium chloride, which is available as Carsoquat® SDQ from Lonza Inc.

Another quaternary ammonium compound contemplated for use in the present invention has the formula $R^{19}R^{20}N^+(CH_3)(CH_2CH_2O)_nH\ X^-$ where $R^{19}$ is a $C_6$–$C_{20}$ linea or branched, substituted or unsubstituted alkyl group or a $C_6$–$C_{20}$ substituted or unsubstituted aryl group, $R^{20}$ is a $C_1$–$C_{20}$ linear or branched, substituted or unsubstituted alkyl group or a $C_6$–$C_{20}$ substituted or unsubstituted aryl group, n is an integer from 1 to 2, and X is defined as above. Preferably, $R^{19}$ and $R^{20}$ are linear or branched $C_8$–$C_{10}$ substituted or unsubstituted groups and more preferably are decyl. X is preferably propionate. An example of such a compound is N,N-didecyl-N-methyl-N-hydroxyethylammonium proprionate, available as Bardap® 26 from Lonza, Inc. of Fair Lawn, N.J.

Yet another suitable quaternary ammonium compound has the formula $R^{19}R^{20}R^{21}(CH_3)N^+X^-$, where $R^{19}$, $R^{20}$, and $R^{21}$ independently are linear or branched $C_6$–$C_{22}$ saturated or unsaturated groups. More preferably $R^{19}$, $R^{20}$, and $R^{21}$ independently are linear or branched $C_8$–$C_{10}$ saturated or unsaturated groups. X is preferably chloride. Examples of such compounds include, but are not limited to, N,N,N-tri (octyl/decyl)-N-methylammonium chloride, which is available as Aliquat® 336 from Aldrich Chemical Company of Milwaukee, Wis. (Aliquat® 336 is a mixture of N,N,N-tri (octyl)-N-methylammonium chloride, N,N-di(octyl)-N-decyl-N-methylammonium chloride, N-octyl-N,N-di (decyl)-N-methylammonium chloride, and N,N,N-tri (decyl)-N-methylammonium chloride.

Suitable amines include, but are not limited to, those having the formula $R^{23}R^{24}R^{25}N$, where $R^{23}$, $R^{24}$, and $R^{25}$ independent are linear, branched, cyclic or any combination thereof saturated or unsaturated groups. The sum of the number of carbon atoms in $R^{23}$, $R^{24}$, and $R^{25}$ broadly ranges from about 10 to about 50. $R^{23}$, $R^{24}$, and $R^{25}$ may be alkyl, alkenyl, alkynyl, cycloalkyl, aryl, or any combination of any of the foregoing.

An amine contemplated for use in the present invention has the formula $R^{23}N(CH_3)_2$ where $R^{23}$ is a linear, branched, cyclic or any combination thereof $C_6$–$C_{30}$ saturated or unsaturated group or $C_6$–$C_{30}$ substituted or unsubstituted aryl group. $R^{23}$ is preferably a linear and saturated $C_8$–$C_{20}$ group. Examples of such compounds include, but are not limited to, N-lauryl-N,N-dimethylamine, which is available as Barlene® 12C from Lonza Inc. of Fair Lawn, N.J.; N-dodecyl-N,N-dimethylamine, which is available as Barlene® 12S from Lonza Inc.; N-hexadecyl-N,N-dimethylamine, which is available as Barlene® 16S from Lonza Inc.; cocodimethylamine; N-octadecyl-N,N-dimethylamine, which is available as Barlene® 18S from Lonza Inc.; hydrogenated tallow dimethylamine; or any combination of any of the foregoing.

Suitable amine salts include, but are not limited to, any salts of the aforementioned amines. The salts may be formed with organic or inorganic acids. Any acid which reacts with the amine may be used. The amine salt may be partially or wholly neutralized by the acid. Preferred salts include, but are not limited to, acetates and dehydroacetates (DHA). The anion may also be any carboxylate or borate anion, such as those described in U.S. Pat. No. 5,641,726. For example, the amine salt may have the formula $R^{26}R^{27}R^{28}N^+Y^-$, wherein $R^{26}$, $R^{27}$, and $R^{28}$, are defined as $R^{23}$, $R^{24}$, and $R^{25}$ above and Y is defined is X as above and any of the aforementioned anions, such as acetate and dehydroacetate. Another example is an amine salt having the formula $R^{29}(CH_3)_2N^+Y^-$, wherein $R^{29}$ is defined as $R^{23}$ above and Y is any of the aforementioned anions.

The weight ratio of amine oxide to wood preservative in the preservative composition broadly ranges from about 1:10 to about 10:1 and preferably ranges from about 1:6 to about 4:1. Where waterproofing properties are desired, the weight ratio preferably ranges from about 1:1 to about 4:1.

The pH of the preservative composition broadly ranges from about 2 to about 12. The pH of the preservative composition preferably ranges from about 6 to about 8 and is more preferably about 7.

The preservative composition may further comprise water and/or other water compatible solvents, such as alcohols, glycols, ketones, and esters. Additionally, the preservative composition may contain other additives as known in the art. The preservative composition typically comprises a uniform distribution and penetration enhancing effective amount of the wood distribution and penetration enhancing agent and a wood preserving effective amount of the wood preservative. The preservative composition generally comprises from about 0.1 to about 10% by weight of amine oxides and from about 0.1 to about 10% by weight of wood preservatives, based on 100% total weight of preservative composition. The preservative composition preferably comprises from about 0.5 to about 4% by weight of amine oxides and from about 0.5 to about 4% by weight of wood preservatives, based on 100% total weight of preservative composition.

Suitable wood substrates include, but are not limited to, Ponderosa pine sapwood, southern yellow pine, and Scots pine.

The preservative composition may be applied to the wood substrate by any method known to one of ordinary skill in the art including, but not limited to, brushing, dipping, soaking, vacuum impregnation, and pressure treatment using various cycles.

Another embodiment is a method for enhancing the uniform distribution and penetration of one or more wood preservatives by applying the wood preservative to the wood substrate and then applying the aforementioned wood distribution and penetration enhancing agent to the wood substrate. A uniform distribution and penetration enhancing amount of the wood distribution and penetration enhancing agent and a wood preserving effective amount of the wood preservative are typically applied. The wood distribution and penetration enhancing agent is generally applied to the wood substrate as a solution containing from about 0.1 to about 10% and preferably from about 0.25 to about 4% by weight of amine oxide, based on 100% total weight of solution. The wood preservatives are also typically applied to the wood substrate as a solution containing from about 0.1 to about 10% and preferably about 0.25 to about 4% by weight of wood preservative, based on 100% total weight of solution. The solutions may contain water and/or other water compatible solvents as described above. The wood penetration enhancing agent and wood preservative may be applied by any of the aforementioned methods.

Alternatively, the wood distribution and penetration enhancing agent may be applied to the wood substrate after application of the wood preservative or both may be applied concurrently.

DESCRIPTION OF THE PREFERRED EMBODIMENTS

The following examples illustrate the invention without limitation. All parts and percentages are given by weight unless otherwise indicated.

EXAMPLE 1

An aqueous treating solution was prepared as follows. An appropriate weight of hexadecyldimethylamine oxide and didecyldimethyl ammonium chloride are mixed. The mixture was heated in a hot water bath to melt and dissolve the components into each other. The mixture was then diluted with warm (40–50° C.) water with stirring to yield an aqueous treating solution containing 2% by weight of hexadecyldimethylamine oxide and 1% by weight of didecyldimethyl ammonium chloride.

COMPARATIVE EXAMPLE 2

An aqueous treating solution containing 1% by weight of didecyldimethyl ammonium chloride was prepared.

EXAMPLE 3

The aqueous treating solutions prepared in Example 1 and Comparative Example 2 were each tested as follows. 2' pieces of kiln dried #1 grade SYP 2×4's were end coated with an epoxy paint. The wood pieces were placed in a pressure treating cylinder for about 30 minutes at about −90 kPa, injected with the aqueous test solution, and pressurized to about 950 kPa for about 30 minutes. The pressure was released by the addition of air, the solution was drained, and the wood pieces were exposed to a vacuum of about −90 kPa for about 30 minutes.

The wood piece was sawn in half and the edge of the wood piece was sprayed with a bromophenol blue solution in acidified ethanol/water to determine the penetration of the didecyldimethyl ammonium chloride preservative.

EXAMPLE 4

The procedure in Example 3 for preparing wood pieces with the aqueous treating solutions prepared in Example 1 and Comparative Example 2 was repeated, except that 40 mm by 90 mm (2×4's) end sealed southern yellow pine pieces were substituted for the Ponderosa pine sapwood pieces.

The results are shown in Table 1 below.

TABLE 1

| Alkylammonium Compound (Quat/Amine) (w/w) | Amine Oxide | Ratio of Quat/Amine to Amine Oxide | Penetration 1st Piece | Penetration 2nd Piece |
|---|---|---|---|---|
| Didecyldimethyl ammonium chloride (1.0%) | None | — | Good | Very Poor |
| Didecyldimethyl ammonium chloride (1.0%) | Hexadecyldimethyl amine oxide (2.0%) | 1:2 | Complete | Complete |
| Didecyldimethyl ammonium chloride (1%) | Hydrogenated tallow dimethyl amine oxide (1.53%) and decyldimethyl amine oxide (0.17%) | 1:1.7 | Complete | Complete |
| Didecyldimethyl ammonium carbonate (pH was about 10.1) (1%) | None | — | Center band not penetrated in both pieces | |
| Didecyldimethyl ammonium carbonate (pH was about 10.0) (1%) | Hexadecyldimethyl amine oxide (2%) | 1:2 | Complete | Very small pocket not penetrated |
| Dehydroxyacetic acid salt of Octadecyldimethyl amine[1] (1%) | None | — | Very Good | Very Poor |
| Dehydroxyacetic acid salt of($C_{16-18}$ alkyl)dimethyl amine[2] (1%) | $C_{16-18}$ alkyldimethyl amine oxide (1.2%) | 1:1.2 | Complete | Complete |
| tri($C_{8-10}$ alkyl)methyl ammonium chloride (1%) | None | — | Could not treat, compound insoluble in water | |
| tri($C_{8-10}$ alkyl)methyl ammonium chloride (0.8%) | Hexadecyldimethyl amine oxide (0.8%) | 1:1 | Very Good | Very Good |
| $C_{12-16}$ alkyl benzyldimethyl ammonium chloride (1%) | None | — | Very Good | Not Completely Penetrated |
| $C_{12-16}$ alkyl benzyldimethyl ammonium chloride and di($C_{14-15}$ alkyl)dimethyl ammonium chloride (1%) | Hexadecyldimethyl amine oxide (1%) | 2:1 | Very Good | Very Good |

TABLE 1-continued

| Alkylammonium Compound (Quat/Amine) (w/w) | Amine Oxide | Ratio of Quat/Amine to Amine Oxide | Penetration 1st Piece | Penetration 2nd Piece |
|---|---|---|---|---|
| Didecyldimethyl ammonium chloride (1%) | None | — | Significant cracks appeared in one of the pieces; Center band not penetrated in both pieces | |
| Didecyldimethyl ammonium chloride and acetic acid (pH was about 3.0) (1%) | None | — | Complete | Complete |
| Didecyldimethyl ammonium chloride (1%) | Decyldimethyl amine oxide (0.25%) | 4:1 | Complete | Complete |
| Didecyldimethyl ammonium chloride and ammonia (pH was about 11.3) (1%) | None | — | Large central zone untreated in both pieces | |
| Didecyldimethyl ammonium chloride and ammonia (pH was about 11.2) (1%) | Decyldimethyl amine oxide (0.25%) | 4:1 | Essentially complete penetration in both pieces | |

[1]The amine salt has low solubility in water. Therefore, the treating solution had to be applied to the wood while hot (about 40–50° C.).
[2]This solution was a clear stable solution at ambient conditions.

EXAMPLE 5

The procedure in Example 3 for preparing wood pieces with the aqueous treating solutions prepared in Example 1 and Comparative Example 2 was repeated with the solutions in Table 2, except that 40 mm by 90 mm (2×4's) end sealed southern yellow pine pieces were substituted for the Ponderosa pine sapwood pieces.

The results are shown in Table 2 below.

TABLE 2

| Treating Solution | Compound | Total Retention Found | Compound Found in Zones (%) Outer 0.3" | Second 0.3" | Inner 0.3" |
|---|---|---|---|---|---|
| Didecyldimethyl ammonium chloride (1.0%) (Piece #1) | Didecyl dimethyl ammonium chloride | Not Determined | 1.2 | 0.7 | 0.5 |
| Didecyldimethyl ammonium chloride (1.0%) (Piece #2) | Didecyldimethyl ammonium chloride | 1.2 | 1.5 | 1.2 | 1.1 |
| Didecyldimethyl ammonium chloride (1%), hydrogenated tallow dimethyl amine oxide (1.53%) and decyldimethyl amine oxide (0.17%) | Didecyldimethyl ammonium chloride | 2.7 | 4.2 | 3.1 | 2.6 |
| | Total amine oxides | 2.8 | 3.6 | 2.7 | 2.1 |
| Didecyldimethyl ammonium chloride (1%) and hexadecyldimethyl amine oxide (2%) | Total for both compounds | 1.6 | 1.8 | 1.8 | 1.4 |
| Hexadecyldimethyl amine, decyldimethyl amine oxide, and hexadecyldimethyl amine oxide | Hexadecyl dimethyl amine | 1.4 | 1.6 | 1.2 | 1.2 |
| | Total amine oxides | 1.3 | 1.5 | 1.2 | 1.1 |
| Didecyldimethyl ammonium chloride, ($C_{16-18}$ alkyl)dimethyl amine salt of dehydroacetic acid, and ($C_{16-18}$ alkyl)dimethyl amine oxide | Didecyl dimethyl ammonium chloride | 0.6 | 0.7 | 0.7 | 0.5 |
| | ($C_{16-18}$ alkyl)dimethyl amine salt of dehydroacetic | Not Determined | 0.5 | 0.4 | 0.4 |

TABLE 2-continued

| Treating Solution | Compound | Total Retention Found | Compound Found in Zones (%) Outer 0.3" | Second 0.3" | Inner 0.3" |
|---|---|---|---|---|---|
| | acid ($C_{16-18}$ alkyl)dimethyl amine oxide) | Not Determined | | | |

EXAMPLE 6

The aqueous treating solutions of Example 1 and Comparative Example 2 are each tested on 19 mm by 36 mm pieces of end sealed Scots pine as follows. The wood pieces are immersed in the aqueous treating solution for about 24 hours. The wood pieces are removed and surface water is blotted.

The wood piece is sawn in half and the edge of the wood piece is sprayed with a bromophenol blue solution in acidified ethanol/water to determine the penetration of the didecyldimethyl ammonium chloride preservative.

EXAMPLE 7

Ten ¾" by ¾" (19 mm by 19 mm) stakes were pressure treated with the treating solutions in Table 3 as follows. Each stake was placed in a vacuum desiccator equipped with an addition funnel and evacuated to a pressure of about −90 kPa for about 30 minutes. The aqueous treating solution was injected into the vacuum desiccator and the vacuum was broken to increase the pressure to about 950 kPa. The stake was allowed to stand for about 30 minutes and then blotted to remove excess solution. The pressure in the vacuum desiccator was decreased to about −90 kPa for about 30 minutes to remove liquid from the wood.

Center sections were cut from each stake and penetration was determined by the following method. A penetration indicator was prepared by dissolving 0.1% by weight of bromophenol blue in about 5% by weight of acetic acid, about 20% by weight of ethanol, and about 75% by weight of water. The penetration indicator was atomized onto the wood surface. Areas of the wood substrate which have a concentration of at least about 10 ppm of quaternary ammonium compounds, amines, and/or amine oxides turn bluish due to the penetration indicator.

The results are shown in Table 3 below.

TABLE 3

| Alkylammonium Compound | Amine Oxide | Ratio of Alkyl-ammonium Compound to Amine Oxide | Penetration |
|---|---|---|---|
| Didecyldimethyl ammonium chloride (1%) | None | — | Poor penetration, centers essentially untreated |
| Didecyldimethyl ammonium chloride (1%) | Hydrogenated tallow dimethylamine oxide (1.53%) and decyldimethyl amine oxide (0.17%) | 1:1.7 | Complete penetration |
| Didecyldimethyl ammonium chloride (1%) | Hexadecyldimethyl amine oxide (2%) | 1:2 | Complete penetration |
| hexadecyldimethyl amine, dehydroacetic acid, and hydroxy acetic acid (amine salt) (1%) | Hexadecyldimethyl amine oxide and decylamine oxide (1.2%) | 1:1.2 | Complete penetration |
| Didecyldimethyl ammonium chloride (1%), $C_{16-18}$ alkyl benzyldimethyl ammonium chloride (1%), $C_{16-18}$ alkyl dimethyl amine/$C_{16-18}$ alkyl dimethyl amine DHA salt* (1%) | $C_{16-18}$ alkyldimethyl amine oxide (1%) | 3:1 | Complete penetration |
| $C_{12-16}$ alkyl benzyldimethyl ammonium chloride (1%) and di($C_{14}$–$C_{15}$ alkyl)dimethyl ammonium chloride (1%) | Hexadecyldimethyl amine oxide (1%) | 2:1 | Complete penetration |

TABLE 3-continued

| Alkylammonium Compound | Amine Oxide | Ratio of Alkyl-ammonium Compound to Amine Oxide | Penetration |
|---|---|---|---|

*Some of the amine was free (not a salt) and the rest was neutralized with dehydroacetate (DHA).

EXAMPLE 8

Wood pieces were treated with the aqueous test solutions in Table 4 below as described in Example 3. Wafers about ¼ inch thick were cut from the wood pieces and tested as follows.

Leaching in Water

About 10 g of the test solution treated wafers were vacuum impregnated with about 200 g of water and soaked in water for about 7 days with occasional shaking. After the 7 days, the concentration of preservative in the water and in the wafers was determined by HPLC and titration methods known in the art.

The results are shown in Table 4.

TABLE 4

| Aqueous Test Solution | Compound Tested for in Wood and Water | Wood Retention (% w/w) Prior to Leaching Experiment | After Leaching Experiment | Concentration of Preservative in Water (% w/w) after Leaching Experiment |
|---|---|---|---|---|
| Didecyldimethyl ammonium chloride | Didecyldimethyl ammonium chloride | 1.2 | 1.2 | None* |
| Didecyldimethyl ammonium chloride, | Didecyldimethyl ammonium chloride | 2.7 | 2.4 | None* |
| octadecyl dimethylamine oxide, hexadecyl dimethylamine oxide, and decyldimethylamine oxide (weight ratio of DDAC to amine oxides was 1:1.7) | Total Amine Oxides | 2.8 | Not Determined | Approximately 10 ppm |
| Didecyldimethyl ammonium chloride and hexadecyl dimethylamine oxide (weight ratio of DDAC to amine oxide was 1:2) | Total DDAC and amine oxide | 1.6 | — | None* |
| Hexadecyl dimethylamine, hexadecyl | Hexadecyl dimethylamine | 1.4 | 1.3 | None* |
| dimethylamine oxide, and decyldimethyl amine oxide | Total Amine Oxide | 1.3 | 1.5 | None* |

*Less than 10 ppm

EXAMPLE 9

Each treating solution in Table 5 below was applied to four 2"×4" pieces of southern yellow pine by the method described in Example 3. Two of the pieces were treated at the concentrations specified and the two other pieces were treated at half the concentrations specified. The pieces were placed outside on a rack and the general appearance of the surfaces was observed after 2 months. The results are shown in Table 5 below.

TABLE 5

| Preservative | Amine Oxide | Weight Ratio of Preservative to Amine Oxide | Observations after 2 months Weathering |
|---|---|---|---|
| — | — | — | Generally drarker surface with sections quite dark and a crack has developed in the surface of one piece. |
| Didecyldimethyl ammonium chloride (1%) | — | — | A few spots and darker black sections partially covering two of the four test pieces, one piece has developed a long deep crack |
| Didecyldimethyl ammonium chloride (1%) | octadecyl dimethylamine oxide, hexadecyl dimethylamine oxide, and decyl dimethylamine oxide (1.7%) | 1:1.7 | Two pieces at higher retention are clean and bright* and two pieces at lower retention showing darker sections and some mildew spots |
| Didecyldimethyl ammonium chloride (1%) | Hexadecyl dimethylamine oxide (2%) | 1:2 | All four pieces were bright and clean, one piece has developed a small crack |
| Hexadecyl dimethyl amine, dehydroacetic acid, acetic acid (amine salt)** (1.2%) | Hexadecyl dimethylamine oxide (1%) | 1.2:1 | All pieces where clean and bright with no surface change |
| $C_{12-16}$ alkyl benzyldimethyl ammonium chloride (1%) and di($C_{14-15}$ alkyl) dimethyl ammonium chloride (1%) | Hexadecyl dimethylamine oxide (1%) | 2:1 | Two pieces were clean and clear, one piece had a darker section while another developed a small crack |
| Didecyldimethyl ammonium chloride (1%), $C_{16-18}$ alkyl benzyldimethyl ammonium chloride (1%), and $C_{16-18}$ alkyl dimethyl amine/$C_{16-18}$ alkyl dimethyl amine DHA (1%) | ($C_{16-18}$ alkyl) dimethylamine oxide (1%) | 3:1 | All four pieces were clean and bright with no surface changes |

*Clean is defined herein as free of mildew; Bright is defined herein as the original wood color.
**Some of the amine was free (not a salt) and the rest was neutralized with dehydroacetate (DHA) and/or acetate.

EXAMPLE 10

10"×¼"×¾" southern yellow pine pieces were treated with the treating solutions in Table 6 below as described in Example 3. The pieces were placed outside and observed over 17 months. The results are shown in Table 6.

TABLE 6

| Alkyl-ammonium Compound (Quat/Amine) | Amine Oxide | Ratio of Quat/Amine to Amine Oxide | Observations 3 months | 10 months | 17 months |
|---|---|---|---|---|---|
| — | — | — | Darker | Weathered gray | Quite dark |
| DDAC (1%) | — | — | Clear and bright | Darker | Still darker |
| DDAC (1%) | Hexadecyl dimethyl amine oxide (2%) | 1:2 | Clear and clean | Clear and clean | Starting to darken |
| DDAC (1%) | ($C_{16-18}$ alkyl) dimethyl amine oxide and decyl dimethyl amine oxide (wt ratio 1.5:0.25) | 1:1.7 | Bright | Bright | Starting to darken |
| DDAC and octadecyl dimethyl amine (1%) | ($C_{16-18}$ alkyl) dimethyl amine oxide and decyl dimethyl amine oxide (wt ratio 1.5:0.2) | 1:2 | Clear and bright | Starting to darken | Still darker |
| Dehydroacetic acid salt of ($C_{16-18}$ alkyl) dimethyl amine (1%) | decyl dimethyl amine oxide (0.1%) | 1:0.1 | Bright and clear | Bright and clean | Starting to darken |
| Dehydroacetic acid salt of octadecyl dimethyl amine (1%) | hexadecyl dimethyl amine oxide (2.3%) | 1:2.3 | Bright and clear | Bright and clean | Still quite bright |

EXAMPLE 11

10"×¼"×¾" southern yellow pine pieces were treated with the treating solutions in Table 7 below as described in Example 3. The pieces were placed outside and observed over 36 months. The results are shown in Table 7.

TABLE 7

| Alkyl-ammonium Compound (Quat/Amine) | Amine Oxide | Ratio of Quat/Amine to Amine Oxide | Observations 15 months | 21 months | 28 months | 36 months |
|---|---|---|---|---|---|---|
| — | — | — | Gray | Green-Gray | Greenish | Dark, early wood erosion |
| DDAC | — | — | Wood has a split | General surface deterioration, split growing | | Dark, greenish cast, early wood erosion |
| Non-biocidal water-proofer[1] | — | — | Wood showing a split | Extensive weathering and deterioration to a gray color | | Dark, wood flaking |
| DDAC | octadecyl dimethyl amine oxide | 1:1 | Good surface | Intact surface with a green haze | | Dark greenish, small split on end |
| Didodecyl dimethyl ammonium chloride | — | — | Small split on surface | Splitting on the surface | — | Large split and smaller cracks |
| ACQ | — | — | — | Surface remaining smoother and | | |

TABLE 7-continued

| Alkyl-ammonium Compound (Quat/ Amine) | Amine Oxide | Ratio of Quat/ Amine to Amine Oxide | Observations 15 months | 21 months | 28 months | 36 months |
|---|---|---|---|---|---|---|
| (Copper type system)[2] | | | | | brown | |

[1]The non-biocidal waterproofer is Thompson's ™ Waterseal available from Thompson and Form by of Memphis, TN.
[2]ACQ is ammoniated copper quat.

EXAMPLE 12

¾"x¼"x5" Ponderosa pine wafers were treated with the treating solutions in Table 8 below as follows. The wafers were placed in a vacuum desiccator and the vacuum pressure was maintained at about −80 kPa for about 15 minutes. The treating solution was injected into the vacuum. The vacuum was broken by the addition of air and the wafers were allowed to stand for about 10 minutes. Excess treating solution was blotted from the wafers. The wafers were returned to the desiccator and another vacuum was drawn to about −80 kPa pressure for about 15 minutes to remove any kickback solution. The pieces were placed outside and observed after 2 years. The results are shown in Table 8.

TABLE 8

| Treating Solution | Observation After 2 Years |
|---|---|
| — | Dull greenish weathered look |
| DDAC | Similar to untreated control |
| Waterproofer[1] | Similar to untreated control |
| Hexadecylamine oxide | Similar to untreated control |
| DDAC (0.5%) and hexadecylamine oxide (1.0%) | Gray |
| DDAC (1.0%) and hexadecylamine oxide (2.0%) | Brownish Gray |

[1]The waterproofer is Thompson's ™ Waterseal available from Thompson and Form by of Memphis, TN.

All patents, applications, articles, publications, and test methods mentioned above are hereby incorporated by reference.

Many variations of the present invention will suggest themselves to those skilled in the art in light of the above detailed description. Such obvious variations are within the fill intended scope of the appended claims.

What is claimed is:

1. A wood preservative composition comprising (a) an amine or a salt thereof; and (b) an amine oxide, wherein the amine has the formula $R^{23}R^{24}R^{25}N$, wherein $R^{23}$, $R^{24}$, and $R^{25}$ independently are linear, branched, cyclic or any combination thereof saturated or unsaturated groups and the sum of the number of carbon atoms in $R^{23}$, $R^{24}$, and $R^{25}$ is from about 10 to about 50.

2. The wood preservative composition of claim 1, wherein $R^{23}$ is a linear, branched, cyclic or any combination thereof $C_6$–$C_{30}$ saturated or unsaturated group or $C_6$–$C_{30}$ substituted or unsubstituted aryl group and $R^{24}$ and $R^{25}$ are methyl.

3. The wood preservative composition of claim 1, wherein the amine oxide has the formula $R^1R^2R^3N \rightarrow O$, wherein $R^1$ is a linear, branched, cyclic or any combination thereof $C_6$ to $C_{40}$ saturated or unsaturated group; and $R^2$ and $R^3$ independently are linear, branched, or any combination thereof $C_1$ to $C_{40}$ saturated or unsaturated groups.

4. The wood preservative composition of claim 3, wherein $R^1$ is a linear, branched, cyclic or any combination thereof $C_6$ to $C_{22}$ saturated or unsaturated group or and $R^2$ and $R^3$ are methyl.

5. The wood preservative composition of claim 1, wherein said amine oxide is selected from the group consisting of (i) a trialiphatic substituted oxide;

(ii) an N-alkylated cyclic amine oxide;

(iii) a dialkylpiperazine di-N-oxide;

(iv) an alkyldi(hydroxy alkyl)amine oxide;

(v) a dialkylbenzylamine oxide;

(vi) a fatty amido propyldimethyl amine oxide;

(vii) a diamine oxide;

(viii) a triamine oxide; and (ix) any combination of any of the foregoing.

6. The wood preservative composition of claim 5, wherein said trialiphatic substituted amine oxide has the formula $R^1R^2R^3N \rightarrow O$, wherein $R^1$ is a $C_6$ to $C_{40}$ saturated or unsaturated group; and $R^2$ and $R^3$ independently are $C_1$ to $C_{40}$ saturated or unsaturated groups.

7. The wood preservative composition of claim 6, wherein $R^1$ is a $C_6$ to $C_{22}$ saturated or unsaturated group and $R^2$ and $R^3$ independently are $C_1$ to $C_{22}$ saturated or unsaturated groups.

8. The wood preservative composition of claim 6, wherein $R^1$ is a linear or branched $C_6$ to $C_{14}$ saturated or unsaturated group.

9. The wood preservative composition of claim 6, wherein $R^2$ and $R^3$ are methyl.

10. The wood preservative composition of claim 6, wherein $R^1$ is a $C_6$–$C_{22}$ saturated or unsaturated group.

11. The wood preservative composition of claim 10, wherein the amine oxide is selected from the group consisting of decyldimethylamine oxide, dodecyldimethylamine oxide, tetradecyldimethylamine oxide, hexadecyldimethylamine oxide, coco-dimethylamine oxide, octadecyldimethylamine oxide, hydrogenated tallow dimethylamine oxide, and any combination of any of the foregoing.

12. The wood preservative composition of claim 1, wherein the amine has the formula $R^{23}N(CH_3)_2$, wherein $R^{23}$ is a linear, branched, cyclic or any combination thereof $C_6$–$C_{30}$ saturated or unsaturated group or $C_6$–$C_{30}$ substituted or unsubstituted aryl group.

13. The wood preservative composition of claim 1, wherein the amine salt has the formula $R^{26}R^{27}R^{28}N^+Y^-$, wherein $R^{26}$, $R^{27}$, and $R^{28}$ independently are linear, branched, cyclic or any combination thereof saturated or unsaturated groups and the sum of the number of carbon atoms in $R^{26}$, $R^{27}$, and $R^{28}$ is from about 10 to about 50, and Y is an anion.

14. The wood preservative composition of claim 1, wherein the amine salt has the formula $R^{29}(CH_3)_2N^+Y^-$, wherein $R^{29}$ is a linear, branched, cyclic or any combination thereof $C_6$–$C_{30}$ saturated or unsaturated group or $C_6$–$C_{30}$ substituted or unsubstituted aryl group, and Y is an anion.

15. The wood preservative composition according to claim 1, wherein the weight ratio of amine oxide to wood preservative in said preservative composition ranges from about 1:10 to about 10:1.

16. The wood preservative composition of claim 15, wherein the weight ratio ranges from about 1:6 to about 4:1.

17. The wood preservative composition of claim 15, wherein the weight ratio ranges from about 1:1 to about 4:1.

18. The wood preservative composition of claim 1, wherein the preservative composition further comprises water.

19. The wood preservative composition of claim 1, wherein the preservative composition comprises from about 0.25 to about 4% by weight of the amine oxides based on 100% total weight of preservative composition.

20. The wood preservative composition of claim 1, wherein the preservative composition comprises from about 0.25 to about 4% by weight of the wood preservatives based on 100% total weight of preservative composition.

21. A method for enhancing the uniform distribution and penetration of at least one wood preservative into a wood substrate, the method comprising applying the wood preservative composition of claim 1 to the wood substrate.

* * * * *